Dec. 3, 1935.  S. A. STAEGE  2,023,106
STOCK CONSISTENCY REGULATOR
Filed May 11, 1934  2 Sheets-Sheet 2

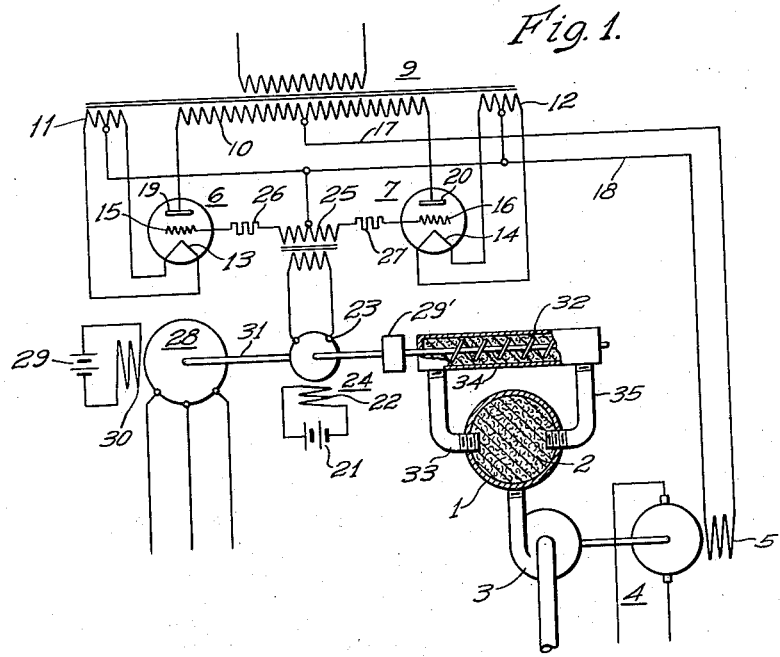

WITNESSES:
C. J. Weller.
Paul E. Friedemann

INVENTOR
Stephen A. Staege.
BY
W. R. Coley
ATTORNEY

Patented Dec. 3, 1935

2,023,106

UNITED STATES PATENT OFFICE 2,023,106

STOCK CONSISTENCY REGULATOR

Stephen A. Staege, Pittsburgh, Pa., assignor to Westinghouse Electric & Manufacturing Company, East Pittsburgh, Pa., a corporation of Pennsylvania Application May 11, 1934, Serial No. 725,093

12 Claims. (Cl. 92—46)

My invention relates to control systems for motors and more particularly to systems for controlling the speed of a motor with reference to the characteristics of a material being operated on in a process of manufacture.

In the art of paper making, it is very important that the consistency of the stock maintain a certain value in order to secure the most desirable results from the manufacturing processes. The consistency, however, is determined by the relative amount of moisture, which may be water, a solution, or some liquid other than water, in the material and, if the amount of moisture is not properly regulated, the product may be unsatisfactory, namely, the weight of the sheet of paper varies, the process of manufacturing may be hindered or slowed down or the material being operated upon may become useless in certain process.

The art of making paper is not, however, the only field of application of my invention, since in the mixing of concrete and many other manufacturing processes, the amount of liquid or solution of a liquid with reference to the solid material is very important.

One object of my invention is to control the amount of liquid that is supplied to a material being operated on in a manufacturing process so that the consistency of the material may be maintained substantially constant.

A more specific object of my invention is to control the consistency of paper stock by appropriately controlling the amount of moisture or water that is added to the material in the process of manufacturing.

Other objects and advantages will become more apparent from a study of the following specification when considered in conjunction with the accompanying drawings, in which:

Figure 1 is a diagrammatic view of a system of control for supplying water to paper stock by the use of a pair of hot cathode electric discharge devices and a magneto alternator;

Fig. 2 is a diagrammatic view of a modification of my invention utilizing an impulse generator and a pair of Ignitron tubes;

Figure 3:
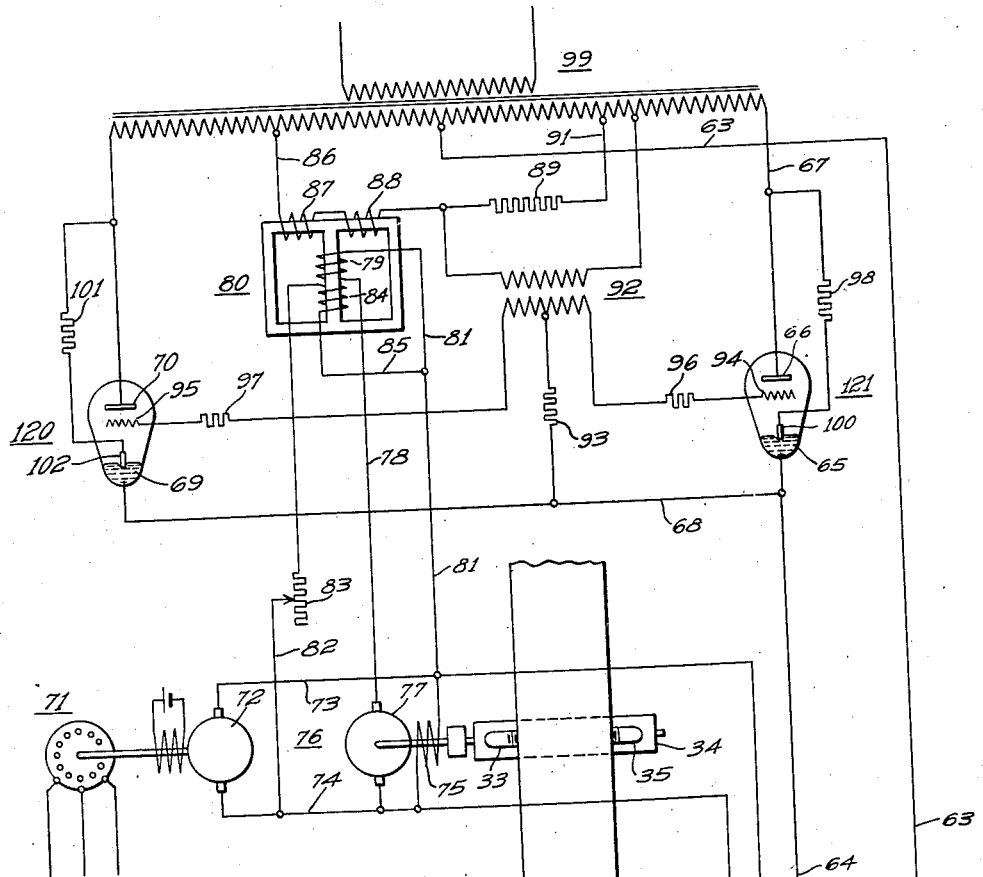
Fig. 3 is a diagrammatic view of a further modification of my invention utilizing Ignitron tubes controlled by a grid for controlling the speed of the motor for supplying the water to the stock.

Referring more particularly to Fig. 1, a vertical pipe or tube 1 is provided along which the stock 2 moves upwardly by means of propelling devices not herein shown nor constituting part of this invention.

A pump 3, of the centrifugal type is disposed somewhere near the bottom of the tube or pipe 1 and is operated by a motor 4 of the direct-current type whose armature is supplied with direct current of substantially constant voltage. The field winding 5 of the motor 4 is interconnected with electric discharge devices 6 and 7 and transformer 9. The electric discharge devices 6 and 7 control the excitation of the field winding 5 in a manner more fully explained hereinafter.

The hot cathode tubes 6 and 7 are provided with cathodes 13 and 14, respectively, and anodes 19 and 20, respectively. The tubes 6 and 7 are controlled by grids 15 and 16, respectively.

To properly measure and control the consistency of the stock 2 in the tube 1, a pair of pipes or conduits 33 and 35 are joined to the pipe 1. The pipe 33 is an intake pipe and pipe 35 is a discharge pipe discharging the material or stock 2 at substantially the same point in the pipe 1, so that any pressure in the stock 2 will not affect the operation of the propeller vanes 32 in the housing 34 connected intermediate the outer ends of the pipes 33 and 35.

A synchronous motor 28, whose field winding 30 is suitably excited from a suitable source 29 through shaft 31, and drives the suitable reduction gearing 29 propeller or vanes 32. The design of the transmission gearing is such that these vanes are driven at a speed sufficiently slow to prevent the material from being thrown away from the propeller. The torque on the motor 28 is thus a true indication of the consistency of the material in the pipe 1. The torque of the motor 28 also determines the angular displacement of the rotor of motor 28 with reference to the rotating field of this motor.

A small alternator 24 having its field winding 22 suitably excited from a suitable source 21 is mounted on the shaft 31 and, when motor 28 is in synchronism with the frequency of the energy supplied to the generator 24 generates an alternating current having 60 cycles. The secondary winding 25 of a transformer having its primary winding connected to alternator 24 is interconnected with the grids 15 and 16 and is thus supplied with a 60 cycle current from the rotating member or armature windings 23 of the alternator 24. For normal operation, the disposition of the rotating member 23 of the alternator 24 is such that the bias of the grids 15 and 16 through the secondary winding 25 and the resistors 26 and 27 causes the field winding 5 to be properly excited. That is, the bias of the grids with reference to the anode is such that the discharge devices 6 and 7 break down at such portion of each cycle of the alternating current supplied by the secondary of the transformer 9 that the field winding 5 is properly energized and the motor 4 rotates at just such speed that the pump 3 supplies the correct amount of water to the stock 2.

If for any reason the consistency is not correct or, let us assume, the amount of water being added to the stock 2 is not sufficient, the relation of the amount of water to the solid material decreases and as a consequence, the viscosity and the load increases and the rotor 28 of the synchronous motor is caused to lag with reference to the rotating field flux by a somewhat greater angle than for normal operation. When this takes place, the alternating current supplied to the grids by the alternator 24 shifts its phase with reference to the alternating current supplied to the anodes of the respective tubes and the bias is shifted in such a direction that a smaller amount of current per cycle is rectified by the discharge devices 6 and 7. In consequence, the excitation of field winding 5 is decreased with the result that the speed of the motor 4 increases to increase the speed of the pump 3, thereby adding more water.

The regulation is very sensitive, since the pump may be a centrifugal pump and for the particular application illustrated operates against a constant head so that any slight variation in the speed of the motor 4 will cause an immediate change in the amount of moisture supplied to the stock 2.

The circuit for the field winding 5 may be traced from the midpoint of the secondary 10 of the transformer 9 through conductor 17, field winding 5, conductor 18, the secondary winding 11, cathode 13 and anode 19 to the left-hand terminal of the secondary 10 and, for the second half of the cycle, the circuit is established from the midpoint of the transformer secondary 10 through conductor 17, field winding 5, conductor 18, secondary 12, cathode 14 and anode 20 to the right-hand terminal of the secondary 10 of the transformer 9.

When too much water is added to the stock 2, the viscosity is lowered and the torque on motor 28 will naturally decrease and as a result the current generated by the alternator 24 will shift its phase position with reference to the principal electrodes of the electric discharge devices 6 and 7 in such a direction as to increase the amount of current rectified by these tubes, thereby increasing the excitation of the field winding 5 to decrease the speed of motor 4 and thus of pump 3, thereby adding less water to the stock 2.

In the modification shown in Fig. 2, elements corresponding in every respect to the elements shown in Fig. 1 have corresponding reference characters. However, in this modification, instead of using hot cathode tubes, which have a comparatively limited current capacity, a pair of Ignitron tubes 37 and 38 are utilized, which Ignitron tubes have their respective anodes 41 and 42 connected to the secondary of the transformer 90 and the cathodes 39 and 40 connected to one terminal of the armature winding of motor 4 through conductor 18. The other terminal of the armature winding is connected by conductor 17 to the mid-junction of the secondary of the transformer 90.

An Ignitron tube, broadly stated, is a mercury arc rectifier having a control circuit, or an ignition circuit, for igniting the tube, or producing the arc, at a particular point of the cycle of the alternating current supplied to the Ignitron tube. If the ignition point can be controlled, it is clear that the amount of current passing through an Ignitron tube can be very effectively controlled. To control the ignition of the Ignitron tubes 37 and 38, an impulse generator 43 is mounted on the shaft of the synchronous motor 28. This impulse generator has a pair of rotating windings or poles 48 and 49 suitably energized from a source of supply 47. The stationary part 44 of the impulse generator 43 is provided with suitable gearing so that the position of the stator with reference to the shaft of the synchronous motor 28, when in a given position, may be properly selected.

The stationary part 44 is provided with a pair of stationary pole windings 50 and 54 which can obviously be shifted about the shaft of the synchronous motor 28, so that ignition of the Ignitron tubes 37 and 38 may be effected at any selected point on the alternating current wave. The winding 50, by a circuit through conductor 51, ignition contact member 52, cathode 39 and conductor 53, is connected to ignite the Ignitron tube 37, whereas winding 54, by a circuit through conductor 55, ignition terminal or contact member 56, cathode 40 and conductor 57 is adapted to ignite Ignitron tube 38. By properly operating the handwheel 46, the stator 44 may be so positioned that just the right amount of speed is secured for motor 4 for a given operation.

Since the moisture supplied to the material 40 and also the operating conditions vary, it is clear that some sort of control or regulation is needed to vary the speed of motor 4 proportional to the actual consistency of the stock 2. This is accomplished by the coaction of the synchronous motor 28 and the impulse generator 43. If the amount of water added is not sufficient, the torque on motor 28 increases and in consequence, the rotating poles 48 and 49 pass the stationary poles 50 and 54 later with reference to the alternating current waves on the tubes, with the result that the ignition of the respective Ignitron tubes 37 and 38 is changed to such a point on the cycle of alternating current supplied to these tubes that the excitation of the armature winding is increased. Motor 4 thus increases in speed, thereby supplying a greater amount of moisture, or water, to the stock 2 by the pump 3.

When too much moisture is added to the stock 2, the motor 28 operates below normal torque and pole pieces 48 and 49 pass the pole pieces 50 and 54 earlier with reference to the alternating current means impressed on the tubes, and the result is that the excitation of the armature winding is decreased, thereby decreasing the speed of the motor 4 and thus decreasing the amount of water added to the stock.

In the modification shown in Fig. 3, Ignitron tubes are again utilized but these Ignitron tubes are of the type utilizing a pair of grids to control the ignition. Furthermore, a synchronous motor is not utilized to drive the vanes in housing 34, but a direct current motor 76 is coupled to drive these vanes. This direct current motor has its field winding 75 energized from a constant voltage exciter 72 driven by a motor 71.

Since exciter 72 is of the constant voltage type, a constant potential will be impressed across terminals or buses 73 and 74 and, in consequence, the field winding 62 of the motor 60 driving the pump 3 will be energized a constant amount and any speed control for the pump 3 must be effected by varying the voltage supplied to the armature 61 of the motor 60.

To appropriately control the grid bias of the grids 95 and 94 of the respective Ignitron tubes, a three-core reactor 80 is utilized which has a pair of windings 87 and 88 connected across a portion of the secondary winding of the transformer 99 through conductor 86, resistor 89 and conductor 91. The three-core reactor has a winding 84 connected to the constant potential buses 73 and 74 through a conductor 82, a variable resistor 83 and conductors 85 and 81. Another winding 79 on the central core of the three core reactor is connected in series circuit relation with the armature 77 of the motor 76 through a conductor 78. Since the motor 76 has its field winding excited a constant amount, the armature current of the motor 76 will be an accurate measure of the consistency of the stock in tube 1. The primary of a transformer 92 is connected across the resistor 89 and a portion of the secondary of the transformer 99 and is thus energized as a function of the saturation of the three-core reactor. The secondary winding of this transformer 92 has its outer terminals connected to the grids 94 and 95, respectively, through the resistors 96 and 97, respectively. The mid-portion of the secondary of the transformer 92 is connected to the cathodes 65 and 69 through a resistor 93 and a conductor 68. Any variation of the armature current in motor 76 changes the saturation of the three-core reactor and this, in turn, changes the bias of the grids with reference to the principal electrodes 70 and 69, and 66 and 65 of Ignitron tubes 120 and 121, respectively. The ignition circuit for Ignitron tube 120 includes the resistor 101 and ignition terminal 102, whereas the ignition circuit of the Ignitron tube 121 includes the resistor 98 and ignition terminal 100.

As the saturation of the three-core reactor varies, the amount of current rectified by the Ignitron tubes 120 and 121 is varied a corresponding amount so that if the stock has an insufficient amount of moisture, more current is rectified by the Ignitron tubes and a higher voltage is impressed on the armature 61 of the motor 60, thus increasing the speed of the pump 3 and, in consequence, the amount of moisture with reference to the solid portion or particles of the stock 2 is increased. When the saturation is in an opposite sense, namely, when the torque on armature 77 decreases, the amount of current rectified by Ignitron tubes 120 and 121 decreases and the amount of current supplied to the armature 61 decreases to decrease the speed of the pump 3. The circuit for the armature 61 may be traced from the midpoint of the secondary of transformer 99 through conductor 63, armature 61, conductor 64, cathode 65, anode 66 and conductor 67 to the right-hand terminal of the secondary of the transformer 99 and for the second half of the cycle the current passes from conductor 64 through conductor 68, cathode 69 and anode 70 to the left-hand terminal of the secondary winding to the transformer 99.

An important feature of my invention is the apparatus and method of sampling the stock. By taking the stock sample from a given point in the main pipe line 1 carrying the stock and returning the sample to the same pressure point in the line 1, any variations in pressure in the stock pipe line will have substantially no effect upon the rotating vanes of the sampling conveyor, whereas if there were any difference in pressure at the point where the stock is taken out and the point where the stock is returned, such pressure difference would have a decided effect upon the power required to rotate the vanes or conveyor auger. It will be noted that the tubes 33 and 35 enter the main pipe at right angles thereto and project a distance into pipe line 1. A film of water is likely to be present adjacent the walls of the pipe and if the sampling tubes at the intake and discharge ends were flush with the walls the sample taken might not be representative.

In the sampling device shown in Figs. 1, 2 and 3, the material is moved in one direction by the propeller 32. The bearings for the shaft carrying the propeller 32 are thus subject to a thrust which thrust is a function of the consistency of the stock. With an increase in torque on the motor driving the vanes 32 the frictional drag increases so that the motor may be subjected to torque out of proportion to the variation in consistency.

Figure 4:
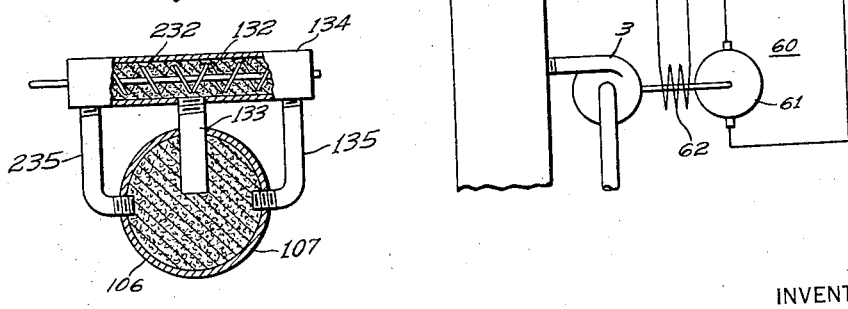
Fig. 4 is a view, partly in elevation and partly in section, of a modified stock-sampling device, wherein variations of friction on the bearings by reason of changes in consistency are eliminated.

To eliminate the effection of friction by reason of a thrust imparted to the vanes the modification shown in Fig. 4 is provided. In this sampling device an intake sampling tube 133 extends to the central or axial region of the pipe 107. Tube 133 is connected to the propeller or conveyor housing 134 at the middle thereof. A conveyor consists of vanes 132 for conveying stock toward the right and of vanes 232 for conveying stock toward the left. The stock is thus discharged back into pipe 1 through pipes 135 and 235 at points having the same pressure as obtains at the intake pipe 133. The pressure in the pipe 107 thus does not affect the torque on the motor driving the conveyor nor is there any thrust effect produced on the bearings for the conveyor vanes. The pressures on the respective vanes 132 and 232 are thus balanced against each other and the torque on the motor is only a function of the stock consistency.

I am aware that the three modifications hereinbefore disclosed and shown in the accompanying drawings are merely illustrative of my invention and that these three modifications do not exhaust the circuit arrangements, that may be devised by those skilled in the art, particularly after having had the benefit of the teachings of my invention, for accomplishing some of the novel results hereinbefore explained and more particularly claimed in the appended claims. It is to be understood, therefore, that these modifications are only illustrative and that my invention is not to be limited to the specific circuit arrangements shown but is only to be limited by the pertinent prior art and the claims appended to this specification.

I claim as my invention:

1. In a system for controlling the consistency of material by controlling the amount of liquid added to the material, in combination, a conveyor for the material, means for adding liquid to the material, a motor, having a field winding, for operating said means, means responsive to the consistency of the material, electric discharge devices for energizing the field of the motor operating said liquid-adding means to control the speed thereof, and means controlled by the means responsive to the consistency of the material to control the operating characteristics of the electric discharge devices to thus control the speed of the motor operating said liquid-adding means, whereby the consistency of the material is maintained substantially constant.

2. In a system for controlling the consistency of material, in combination, a conveyor for the material, means for diverting a portion of the material from the conveyor through a conduit, means associated with said conduit to be responsive to the consistency of the material, an electric discharge device controlled in its operating characteristics by the means responsive to the consistency of the material, a pump adapted to supply liquid to the material, a motor for driving the pump, and means controlled by said electric discharge devices to control the speed of the motor operating the pump in a manner to maintain the consistency of the material substantially constant.

3. In a device for controlling the consistency of paper stock by adding liquid to the stock, in combination, a tube for conveying the stock, a sampling device disposed at a given point along the tube for conveying the stock, operating means for the sampler, means responsive to variations of the liquid content in the paper stock, means for adding liquid to the paper stock, and an electric discharge device controlled by the means responsive to the consistency of the stock for controlling the means for adding liquid to the stock.

4. In a system of control for controlling the consistency of paper stock, a sample tube, a propeller in the tube for moving the paper stock, a synchronous motor for driving the propeller, a pump for adding liquid to the stock, a motor, having a field winding, for driving the pump, an electric discharge device for energizing the field winding of the motor operating the pump to control the speed thereof, and means responsive to the mechanical displacement of the rotor of the synchronous motor operating the propellers with reference to its rotating field to control the operation of the electric discharge device to thus control the speed of the motor operating the pump.

5. In a system of control, an electric discharge device having a pair of principal electrodes, and a control electrode, means for supplying alternating current to the principal electrodes, an alternator normally supplying an alternating current potential to the control electrode having a certain phase relation with reference to the alternating current supplied to the principal electrodes, means for shifting the phase position of the alternating current generated by the alternator with reference to the alternating current supplied to the principal electrodes to thus control the operating characteristics of the electric discharge device, a conveyor for material, means responsive to the consistency of the material to control the operation of the alternator, means for adding liquid to the material, a motor for driving the means for adding the liquid to the material, said motor having a field winding, and circuit connections for interconnecting the field winding of the motor with the electric discharge device whereby the speed of the motor is controlled in response to the variations in operating characteristics of said electric discharge device.

6. In a device for controlling the consistency of material, in combination, a conveyor for the material, a pump for adding liquid to the material, a motor for operating the pump, and means responsive to the liquid content in the material adapted to control the speed of the motor operating the pump to thus control the liquid content in the material.

7. In a system of control for controlling the consistency of material by the addition of an appropriate amount of liquid thereto, in combination, a sampling conveyor, a propeller in said conveyor, means for driving the propeller, means associated with said driving means to be responsive to the variations in the consistency of the material acted upon by said propeller, an electric discharge device whose operating characteristics are controlled by the means responsive to the consistency of the material, and means controlled by said electric discharge device to control the amount of liquid being added to the material to maintain the consistency substantially constant.

8. In a system of control for controlling the consistency of material, in combination, a conveyor for the material, a propeller for moving the material in said conveyor, a motor for driving the propeller, electric discharge devices controlled by the torque of said motor, and means controlled by the variation and operating characteristics of said electric discharge device for adding liquid to the material.

9. In a system of control for controlling the consistency of material, a conveyor for the material, a closed-circuit sampling conduit for taking a sample from said conveyor, a motor for moving the material through said sampling tube, an impulse generator mounted on the shaft of said motor and responsive in the generation of its impulses to the torque of said motor, an Ignitron tube adapted to be ignited by said impulse generator as a function of the torque on said motor, a pump for adding liquid to the material in the conveyor, a motor for driving the pump, and circuit connections interconnected with said Ignitron tube for controlling the speed of the motor operating the pump to thus maintain the consistency of the material substantially constant.

10. In a system for controlling the consistency of paper stock, in combination, a tube along which the stock is moved, a closed-circuit conduit for taking a sample at a given point along the tube, a propeller in the closed-circuit conduit for moving the sample of material through said conduit, a synchronous motor for driving the propeller, an impulse generator adapted to generate voltage impulses whose phase position with reference to the rotating field of the synchronous motor is determined by the torque on said motor, an Ignitron tube adapted to be ignited by said voltage impulses of said impulse generator, a motor having a field winding interconnected with the Ignitron tube whereby the speed of the motor is controlled by the Ignitron tube, and a pump driven by said last-named motor and adapted to add liquid to the stock.

11. In a system of control for controlling the amount of liquid to be added to a material to control its consistency, in combination, a conduit for the material, a pump for adding liquid thereto, a motor for driving the pump, a closed circuit sampling conduit adapted to take a sample at a given point along the conduit and return the sample to the conduit at substantially the same point, a propeller in the sampling conduit, a motor for driving the propeller, a three-core reactor, circuit connections for controlling the saturation of said three-core reactor as a function of the torque of the motor driving the propeller, electric discharge devices controlled by said three-core reactor, and circuit connections interconnecting the motor driving the pump and the electric discharge devices to control the speed of the motor driving the pump by the variations in the operating characteristics of said electric discharge devices, whereby the consistency of the material may be maintained substantially constant.

12. In a system of control for controlling the consistency of paper stock, a conduit for conveying the stock from one position to another, a closed-circuit conduit for taking a sample from the tube at a given point thereof and returning the sample at substantially the same point, a propeller in said sampling conduit, a motor for driving the propeller, a three-core reactor responsive to the torque of the motor driving the propeller, a grid-controlled Ignitron tube, circuit connections interconnecting the grid of the tube with the three-core reactor whereby the ignition of the Ignitron tube is controlled as a function of the torque of the motor driving the propeller, a pump for adding liquid to the tube, and circuit connections interconnecting said pump-driving motor with the Ignitron tube whereby the amount of liquid added to the stock by the pump is determined by the operating characteristics of the Ignitron tube and thus by the consistency of the material.

STEPHEN A. STAEGE.